(12) United States Patent
Gillette et al.

(10) Patent No.: US 11,879,653 B2
(45) Date of Patent: *Jan. 23, 2024

(54) PORTABLE THERMOSTAT SYSTEMS AND METHODS

(71) Applicant: Johnson Controls Technology Company, Auburn Hills, MI (US)

(72) Inventors: Theresa N. Gillette, Wichita, KS (US); Jonathan A. Burns, Wichita, KS (US)

(73) Assignee: Johnson Controls TYCO IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,978

(22) Filed: Feb. 16, 2021

(65) Prior Publication Data

US 2021/0164680 A1 Jun. 3, 2021

Related U.S. Application Data

(63) Continuation of application No. 15/925,535, filed on Mar. 19, 2018, now Pat. No. 10,955,162.

(60) Provisional application No. 62/639,876, filed on Mar. 7, 2018.

(51) Int. Cl.
| | | |
|---|---|---|
| *F24F 11/523* | (2018.01) | |
| *F24F 11/56* | (2018.01) | |
| *F24D 19/10* | (2006.01) | |
| *F24D 5/12* | (2006.01) | |
| *G05D 23/19* | (2006.01) | |
| *F24F 110/20* | (2018.01) | |
| *F24F 130/00* | (2018.01) | |
| *F24F 110/10* | (2018.01) | |

(52) U.S. Cl.
CPC ............ *F24F 11/523* (2018.01); *F24D 5/12* (2013.01); *F24F 11/56* (2018.01); *G05D 23/1905* (2013.01); *G05D 23/1917* (2013.01); *G05D 23/1934* (2013.01); *F24F 2110/10* (2018.01); *F24F 2110/20* (2018.01); *F24F 2130/00* (2018.01); *G05B 2219/2614* (2013.01); *G05B 2219/36159* (2013.01)

(58) Field of Classification Search
None
See application file for complete search history.

(56) References Cited

U.S. PATENT DOCUMENTS

| | | |
|---|---|---|
| 1,962,884 A | 6/1934 | Wagner, Jr. |
| 5,839,654 A | 11/1998 | Weber |
| 9,253,260 B1 | 2/2016 | Bailey et al. |
| (Continued) | | |

OTHER PUBLICATIONS

Rumy—A Remote Extension for Thermostats, May 3, 2016, 10 pgs., https://rumy.io/.

(Continued)

*Primary Examiner* — Mohammad Ali
*Assistant Examiner* — David Earl Ogg
(74) *Attorney, Agent, or Firm* — Fletcher Yoder, P.C.

(57) ABSTRACT

The present disclosure relates to a thermostat including a control base configured to couple with and support a portable thermostat, wherein the control base is configured to determine a measure of an environmental condition of a local environment of the control base and communication circuitry of the control base configured to communicate the measure to facilitate control of an HVAC system.

20 Claims, 7 Drawing Sheets

(56) References Cited

U.S. PATENT DOCUMENTS

| | | |
|---|---|---|
| 9,677,776 B2 | 6/2017 | Clifton et al. |
| 9,765,983 B2 | 9/2017 | Schultz et al. |
| 9,846,443 B2 | 12/2017 | Mucignat et al. |
| 2003/0209638 A1 | 11/2003 | Peltz |
| 2007/0228183 A1* | 10/2007 | Kennedy ............ G05D 23/1905 236/1 C |
| 2012/0061480 A1* | 3/2012 | Deligiannis ............ G05B 15/02 340/5.2 |
| 2012/0191257 A1* | 7/2012 | Corcoran ............ H04L 12/2818 700/278 |
| 2012/0252430 A1 | 10/2012 | Imes et al. |
| 2013/0123991 A1 | 5/2013 | Richmond |
| 2014/0203091 A1 | 7/2014 | Nair |
| 2015/0276238 A1* | 10/2015 | Matsuoka ................ F24F 11/00 700/278 |
| 2015/0292764 A1* | 10/2015 | Land, III ................ F24F 11/62 700/278 |
| 2015/0370615 A1 | 12/2015 | Pi-Sunyer |
| 2016/0116183 A1 | 4/2016 | Lazar et al. |
| 2016/0161138 A1* | 6/2016 | Fadell .................... G05B 15/02 700/278 |
| 2016/0205196 A1* | 7/2016 | Hasan ................ G05D 23/1934 709/208 |
| 2020/0200422 A1* | 6/2020 | Xu ........................ G05B 15/02 |

OTHER PUBLICATIONS

Technical Specifications, Rumy—A Remote Extension for Thermostats, May 3, 2016, 4 pgs., https://rumy.io/tech_specs?m_pdc=1&_sm_rid=D52r3PDWrjDBMSh1NvP1jDV1VBPn1F3PBvst3Q5.

\* cited by examiner

PORTABLE THERMOSTAT SYSTEMS AND METHODS

CROSS REFERENCE TO RELATED APPLICATION

This application is a continuation of U.S. patent application Ser. No. 15/925,535, entitled "PORTABLE THERMOSTAT SYSTEMS AND METHODS," filed Mar. 19, 2018, which claims priority to and the benefit of U.S. Provisional Patent Application No. 62/639,876, entitled "PORTABLE THERMOSTAT SYSTEMS AND METHODS," filed Mar. 7, 2018, each of which is hereby incorporated by reference in its entirety for all purposes.

BACKGROUND

The present disclosure relates generally to heating, ventilation, and air conditioning systems. A wide range of applications exist for heating, ventilation, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration. In many HVAC systems, the thermostat may be used to control a set-point temperature.

SUMMARY

The present disclosure relates to a thermostat including a control base configured to couple with and support a portable thermostat, wherein the control base is configured to determine a measure of an environmental condition of a local environment of the control base and communication circuitry of the control base configured to communicate the measure to facilitate control of an HVAC system.

The present disclosure also relates to a control system configured to control operation of the HVAC system, a control base of the control system configured to determine a first state of a first local environment where the control base is located, and a portable thermostat of the control system configured to determine a second state of a second local environment where the portable thermostat is located, wherein the portable thermostat is configured to mount to the control base.

The present disclosure further relates to a heating and cooling system having a heating, ventilation, and air conditioning (HVAC) system configured to condition a building according to a set-point temperature, a control base communicatively coupled to the HVAC system and comprising a temperature sensor and a humidity sensor, wherein the control base is configured to be disposed within a first environment of the building and is configured to receive data indicative of a temperature and a humidity level of a second environment of the building from a portable thermostat, wherein the first environment of the building is different than the second environment of the building and control the HVAC system based on the data indicative of the temperature and the humidity level of the second environment.

DRAWINGS

DETAILED DESCRIPTION

The present disclosure is directed to heating, ventilation, and air conditioning (HVAC) systems which may be controlled via a portable thermostat. Particularly, the portable thermostat may measure a temperature and humidity level of its local environment, which may change depending the location of the portable thermostat within a building. In this manner, the HVAC system may provide cooled or heated air to adjust a temperature of the local environment of the portable thermostat to match a set-point temperature. Indeed, a user may move the portable thermostat into a particular area or room of a building to accurately condition the particular area or room to a suitable comfort level. The portable thermostat may be mounted to a control base, which may be mounted to a wall of a building. A power supply of the portable thermostat may be charged when mounted to the control base. In certain embodiments, the control base may also serve as a thermostat that is capable of measuring a temperature and humidity level of its environment. In other words, the portably thermostat and the control base may both include thermostat functions that may adjust a condition setting of one or more rooms in the building.

Figure 1:
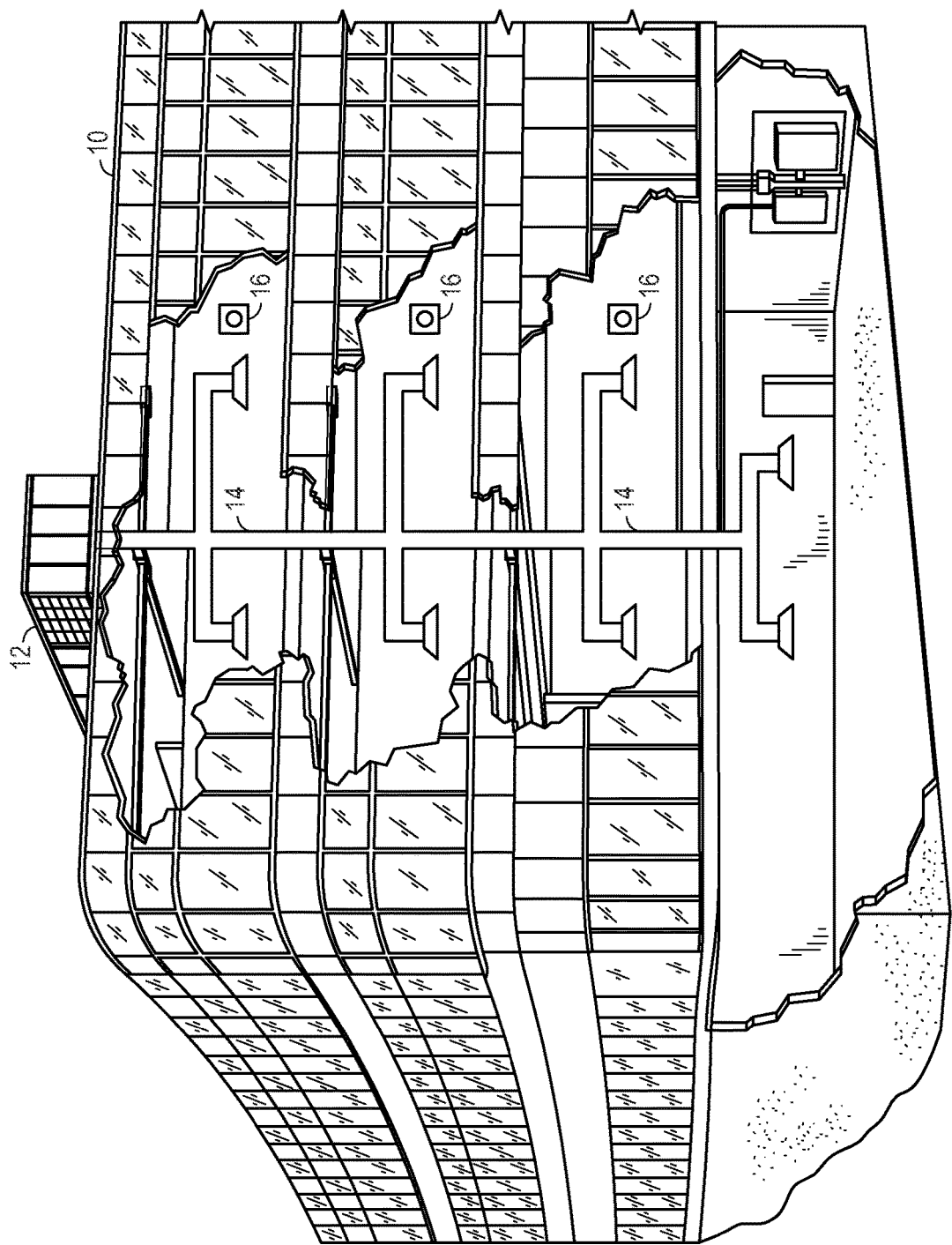
FIG. 1 is a perspective view of a heating, ventilation, and air conditioning (HVAC) system for building environmental management that may employ one or more HVAC units, in accordance with an embodiment of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
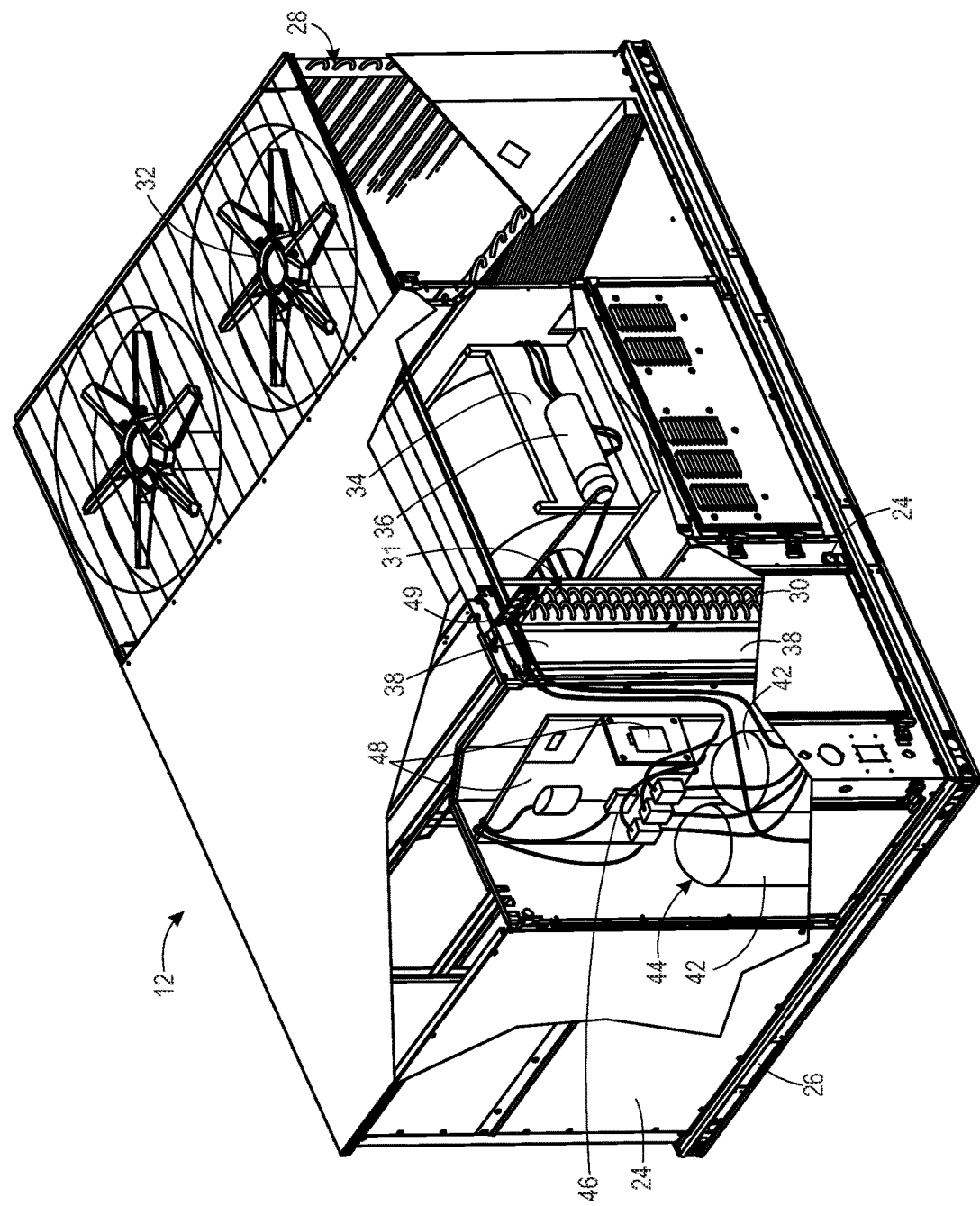
FIG. 2 is a perspective view of an HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
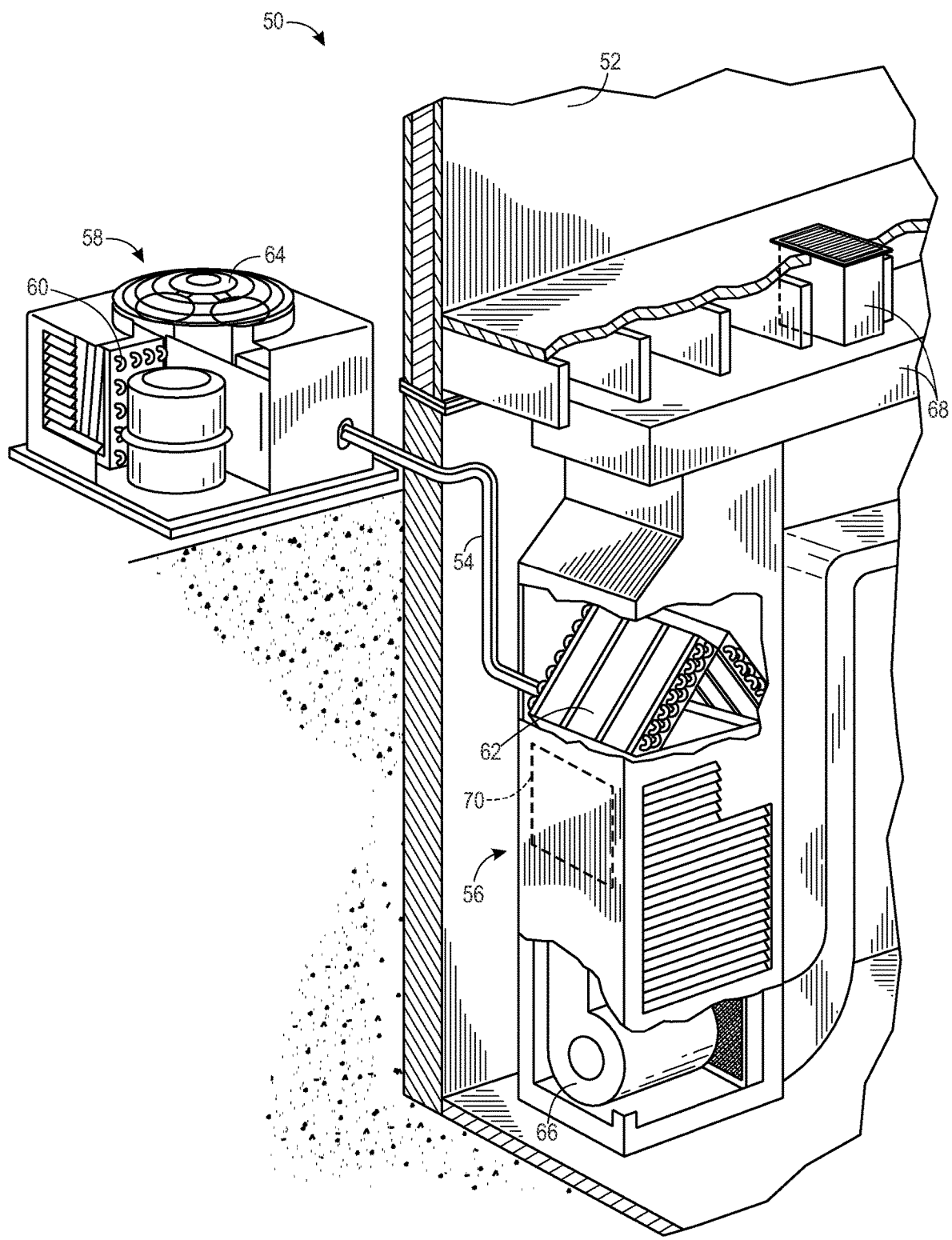
FIG. 3 is a perspective view of a residential split heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
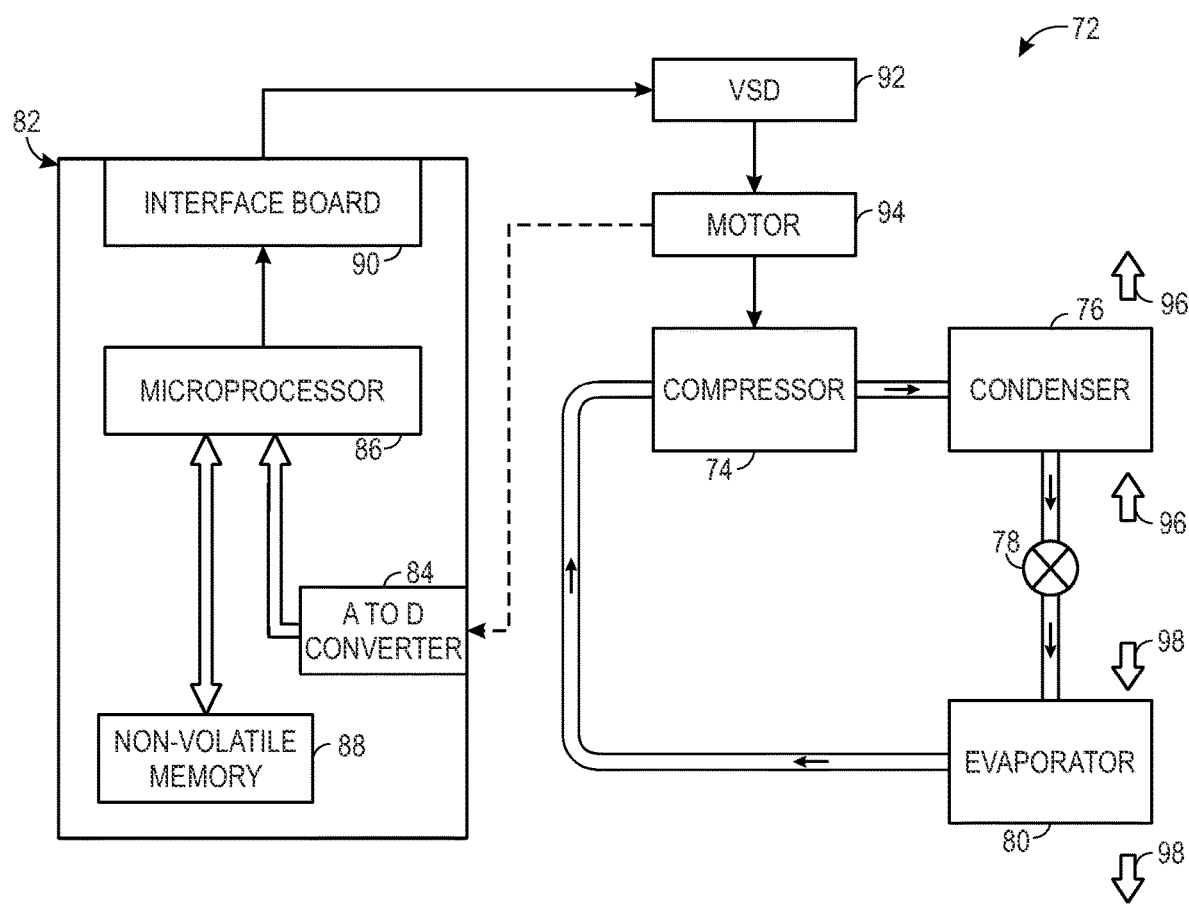
FIG. 4 is a schematic view of a vapor compression system that may be used in an HVAC system, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, a thermostat, such as the control device 16 may be removable from a base and may include temperature and humidity sensors. That is, the thermostat may be portable and may measure the temperature and humidity of its local environment. In this manner, the thermostat may communicate with an HVAC system, such as the HVAC unit 12, the heating and cooling system 50, and/or the vapor compression system 72 to supply conditioned air to a building, such as the building 12.

Figure 5:
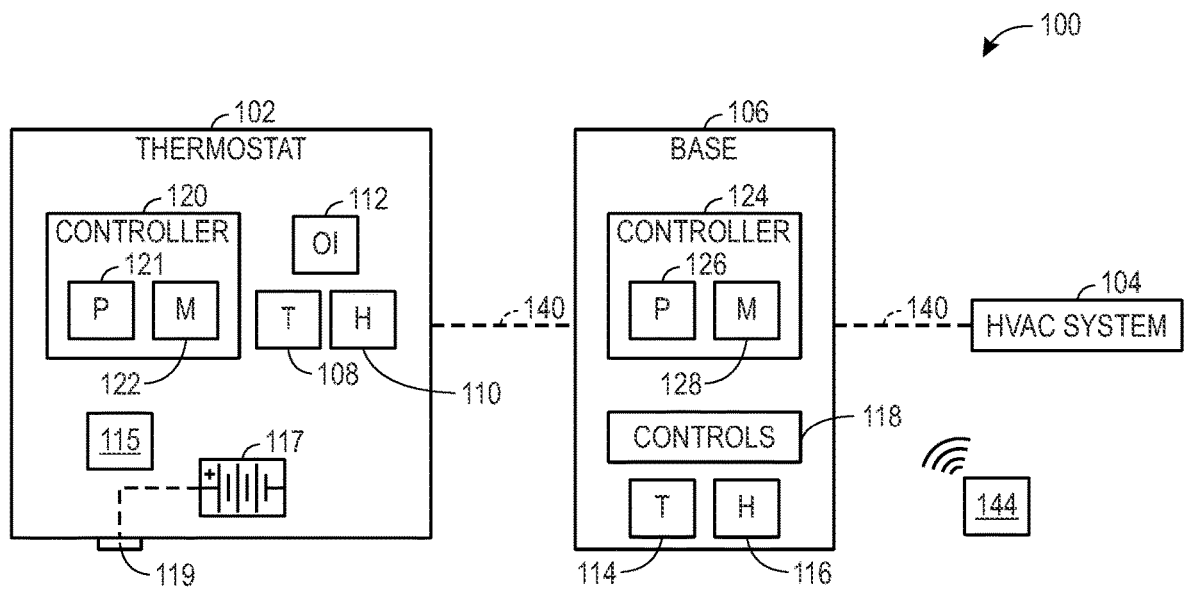
FIG. 5 is a schematic view of a heating and cooling system, in accordance with an embodiment of the present disclosure.

To illustrate, FIG. 5 is a block diagram of a heating and cooling system 100 that may utilize a thermostat 102, such as a portable thermostat, to control an HVAC system 104 through a control base 106. As discussed herein, the thermostat 102 may be portable, such that it may be moved about a building, such as the building 10 or the residence 52, or may be mounted to the control base 106. The control base 106 may be stationary and mounted to a wall of the building 10 or residence 52. In certain embodiments, the building 10 or residence 52 may include multiple control bases 106, and the thermostat 102 may be configured to mount to each of the control bases 106. The HVAC system 104 may be any suitable HVAC system configured to supply conditioned air, heated air, and/or dehumidified air. For example, the HVAC system 104 may include the HVAC unit 12, the heating and cooling system 50, and/or the vapor compression system 72. Overall, the HVAC system 104 may supply the conditioned and/or heated air to climatize a local environment of the thermostat 102 and/or the control base 106 to match a set-point temperature. In certain embodiments, the HVAC system 104 may include multiple HVAC units 12 and/or multiple heating and cooling systems 50 and/or vapor compression systems 72, and the thermostat 102 and control base 106 may be able to control one or more of the HVAC units 12, heating and cooling systems 50, and/or vapor compression systems 72 based on a location of the thermostat 102 and control base 106.

Generally, the thermostat 102 may be portable and configured to measure a state or condition, such as a temperature and humidity level, of its local environment, such that the HVAC system 104 may be operated to provide conditioned air based on the local environment of the thermostat 102 and a set-point temperature. Indeed, the thermostat 102 may include a temperature sensor 108 and a humidity sensor 110 configured to measure a temperature and humidity level, respectively, of its local environment. The thermostat 102 may further include an operator interface 112, such as a touch screen, a graphical user interface (GUI), buttons, knobs, dials, slides, or any combination thereof. The operator interface 112 may provide a system for a user to adjust various settings, such as a mode of the HVAC system 104, a set-point temperature, and a schedule. As used herein, the mode of the HVAC system 104 may refer to whether the HVAC system 104 is in a heating mode, a cooling mode, an automatic mode, such as switching, without user input, between heating and cooling based on a measured temperature relative to the set-point temperature, and an off mode. The schedule may refer to certain set-point temperatures or modes that are set to occur during certain days and/or times of day. For example, a user may edit the schedule, such that a first set-point temperature is used for a first portion of the day, and a second set-point temperature is used for a second portion of the day. In certain embodiments, the control base 106 may also include a temperature sensor 114 and a humidity sensor 116 configured to measure a temperature and humidity level, respectively, of its local environment. The control base 106 may further include controls 118 to provide a system for a user to adjust various settings such as a mode of operation of the HVAC system 104 and a set-point temperature. Indeed, in some embodiments, a user may control a mode, a set-point temperature, and a schedule of the HVAC system 104 through the thermostat 102 and/or the control base 106.

The HVAC system 104 may supply conditioned or heated air according to a local environment of either the thermostat 102 or the control base 106. That is, the thermostat 102 or the control base 106 may act as a primary device to which the HVAC system 104 bases its operation. For example, a user may select, from either the operator interface 112 of the thermostat 102 or the controls 118 of the control base 106, whether the thermostat 102 or the control base 106 is the primary device.

The thermostat 102 may also include a battery 117, or other suitable energy storage device. The battery 117 may be charged via the control base 106 when the thermostat 102 is mounted to the control base 106 and/or may be charged via a power cord. Indeed, the thermostat 102 may further include a charging port 119 which may receive power through the power cord from a power grid, for example. Further, in certain embodiments, the control base 106 may, upon input from a user, activate an alarm 115 within the thermostat 102, thereby notifying a user of its location.

In certain embodiments, the location of the thermostat 102 may be determined via coordination and/or communication between the thermostat 102 and multiple control bases 106 and/or via coordination and/or communication with multiple control bases 106. For example, the residence 52 may include multiple control bases 106, such as a first control base on a first level of the residence 52 and a second control base on a second level of the residence 52. The first and second control bases 106 may communicate with one another and/or with the thermostat 102 via Bluetooth, Wi-Fi, a wired connection, other wireless connection, or other suitable connection. Via this communication, the location of the thermostat 102 may be determined. For example, communication between the first and second control bases 106 and the thermostat 106 may indicate that the thermostat 102 is located on the first floor or the second floor. This determination may then be displayed on a respective display or operator interface of each of the control bases 106 and thermostat 102.

Further, the thermostat 102 may include a controller 120, which may employ a processor 121, which may represent one or more processors, such as an application-specific processor. The controller 120 may also include a memory device 122 for storing instructions executable by the processor 121 to perform the methods and control actions described herein for the heating and cooling system 100. The processor 121 may include one or more processing devices, and the memory 122 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 121 or by any general purpose or special purpose computer or other machine with a processor. The control base 106 may also include a controller 124 having a processor 126 and a memory device 128, which may have similar features as described above with regard to the processor 121 and the memory device 122 of the controller 120.

As discussed herein, the thermostat 102 and/or the control base 106 may measure and determine a state of their respective local environments via their respective sensors 108, 110, 114, 116 and their respective controllers 120, 124. Further, the thermostat 102 and/or the control base 106 may communicate the state or condition of their respective local environment to the HVAC system 104, which may in turn supply air based on a set-point temperature and/or a selected mode of operation relative to the state or condition of the particular local environment. In certain embodiments, the thermostat 102 may communicate with the HVAC system 104 through the control base 106. To this end, the thermostat 102, the control base 106, and the HVAC system 104 may be communicatively coupled through a communication system 140. In some embodiments, the communication system 140 may communicate through a wireless network, such as wireless local area networks [WLAN], wireless wide area networks [WWAN], near field communication [NFC], or Bluetooth. In some embodiments, the communication system 140 may communicate through a wired network such as local area networks [LAN], or wide area networks [WAN]. For example, in some embodiments, the thermostat 102 may communicate with the control base 106 through a wireless network, while the control base 106 may communicate with the HVAC system 104 through a wired network. In one embodiment, when the thermostat 102 is mounted to the control base 106, the control base 106 may function as a client.

Further, in certain embodiments, the HVAC system 104 may operate based on input from a mobile device 144, such as a computer, a smart phone, a tablet, and so forth. For example, through the mobile device 144, a user may select a set-point temperature, and a mode from an application installed on the mobile device 144. The user may also utilize the mobile device 144 to select either the thermostat 102 or the control base 106 the primary device. As mentioned above, the primary device may be the device, such as the thermostat 102 or the control base 106, having a local environment to which the HVAC system 104 supplies conditioned air to meet the set-point temperature.

Figure 6:
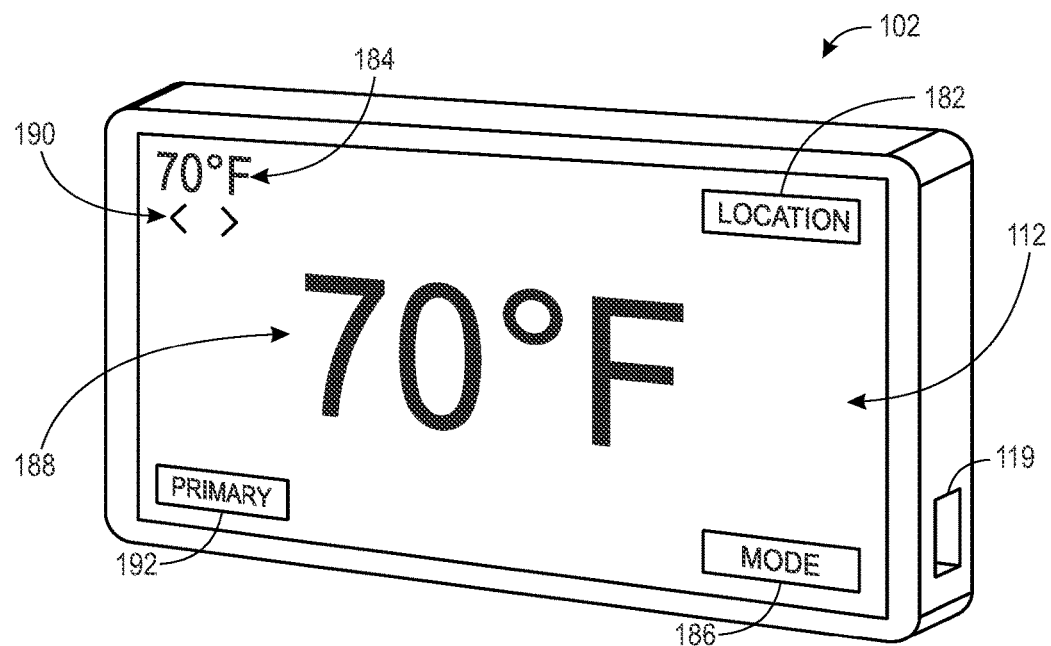
FIG. 6 is a perspective view of a thermostat of the heating and cooling system of FIG. 5, in accordance with an embodiment of the present disclosure.

FIG. 6 is a schematic perspective view of an embodiment of the thermostat 102. As mentioned above, the thermostat 102 may include the operator interface 112. The thermostat 102 may also include the charging port 119 configured to receive power from an external source to power the battery 117 (FIG. 5) and/or power various elements of the thermostat 102, such as the controller 120, the operator interface 112, or the sensors 108, 110. In certain embodiments, charging port 119 may accept/draw power through a universal serial bus (USB), a micro USB, charging pins, or any combination thereof. Indeed, the charging port 180 may be coupled to a power source such as direct current (DC) or alternating current (AC) power source.

As shown, the operator interface 112 may provide for selection and display of a location 182, selection and display of a set-point temperature 184, selection and display of a mode 186, and display of an actual temperature 188. The location 182 may refer to a location within the building 10 or residence 52 and may be associated with a preset set-point temperature. For example, a user may select, or input, a location within the building 10 or residence 52, such as master bedroom, bathroom, second bedroom, and so forth, and further select, or input, a set-point temperature to be associated with the selected location. Data indicative of the location and the associated set-point temperature may be saved in the memory 122 for later recall. In this manner, as the thermostat 102 is moved from one room to another, the user may select the room in which the thermostat 102 is located and the set-point temperature that the user previously associated with the room will become the set-point temperature. That is, the HVAC system 104 may provide conditioned air according to the set-point temperature of the location 182 and the actual temperature 188 of the local environment.

In embodiments where the HVAC system 104 includes multiple HVAC units 12, heating and cooling systems 50, and/or vapor compressions systems 72, the thermostat 102 may be configured to select or control which of the multiple HVAC units 12, heating and cooling systems 50, and/or vapor compressions systems 72 is adjusted based on the location or changing location of the thermostat 102. For example, if the thermostat 102 is moved from a first floor of the residence 52 that is conditioned by a first heating and cooling system to a second floor of the residence 52 that is conditioned by a second heating and cooling system, the thermostat 102 may discontinue adjustment of the first heating and cooling system operation and being adjustment of the second heating and cooling system operation.

As discussed herein, the set-point temperature 184 is the temperature to which the HVAC system 104 climatizes the building. That is, the HVAC system 104 may provide heated or cooled air such that an actual temperature, such as the actual temperature 188, of a local environment of the thermostat 102 and/or the control base 106 substantially matches the set-point temperature 184. In certain embodiments, the set-point temperature 184 may be adjusted by a user through controls 190 of the operator interface 112. As shown, the controls 190 may be buttons, or portions of a touch screen that allow the user to increase or decrease the set-point temperature 184. However, in certain embodiments, the controls 190 may be a dial, a sliding scale, or any other suitable type of actuator.

Further, the mode 186 may indicate the mode of operation of the HVAC system 104. For example, the HVAC system 104 may be set to a cooling mode in which the HVAC system 104 is configured to supply cool air, a heating mode in which the HVAC system 104 is configured to supply heated air, an off mode in which the HVAC system 104 is configured to discontinue a supply of conditioned air, or an automatic mode in which the HVAC system 104 is configured to automatically switch between the heating mode and the cooling mode based on the set-point temperature 184 relative to the actual temperature 188 of the local environment.

In certain embodiments, the thermostat 102 may also include an indicator 192, which may indicate whether the thermostat 102 or the control base 106 is the primary device controlling operation the HVAC system 104. Indeed, in certain embodiments, the indicator 192 may display a word, such as 'primary', a symbol, a light, a flashing light, or any other suitable visual display that communicates whether the thermostat 102 or the base 106 is the primary device. As mentioned above, the primary device may be the device to which the HVAC system 104 responds when providing conditioned air to the building 10 or residence 52. That is, the HVAC system 104 may provide heated or cooled air such that the local environment of the primary device substantially matches the set-point temperature.

The thermostat 102 may also include a selection option that the user may utilize to switch between the thermostat 102 and the control base 106 as the primary device. Indeed, in certain embodiments, each of the location 182, the set-point temperature 184, the mode 186, the actual temperature 188, and the indicator 192 may be selected through an appropriate icon on the user interface 112 and adjusted by selection of an appropriate item from a drop-down menu that appears upon selection of the appropriate icon. As shown on the user interface 112, the appropriate icon may be a visual representation of the location 182, of the set-point temperature 184, of the mode 186, of the actual temperature 188, or of the indicator 192.

Figure 7:
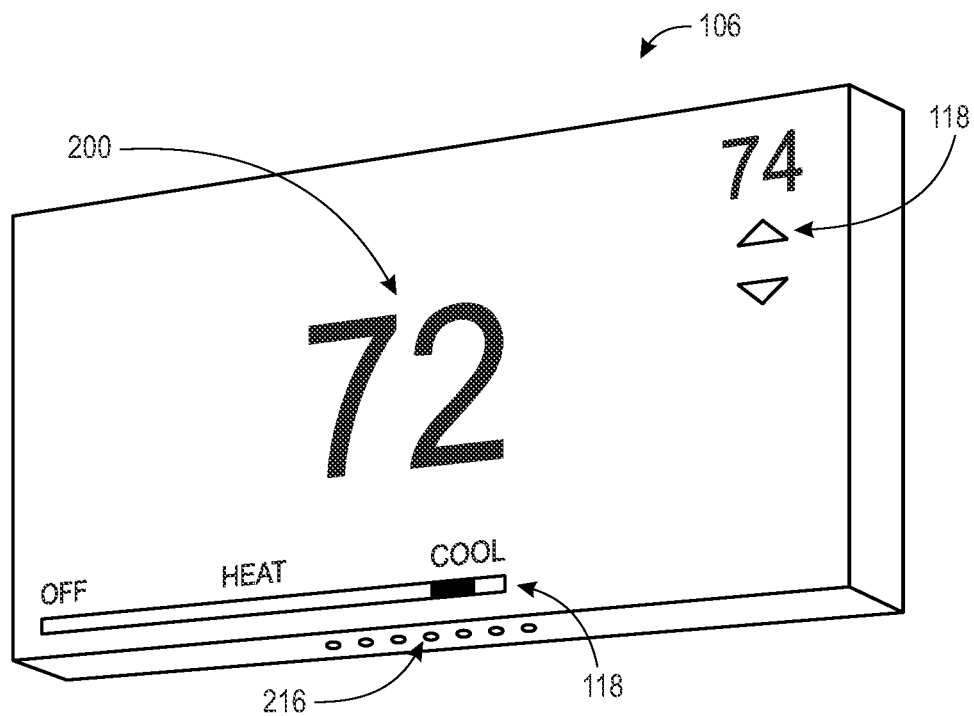
FIG. 7 is a perspective view of a base of the heating and cooling system of FIG. 5, in accordance with an embodiment of the present disclosure.

FIG. 7 is a schematic view of the control base 106. As discussed above, the control base 106 may include the controls 118 that adjust a set-point temperature and a mode of the HVAC system 104 based on input from a user. Indeed, the controls 118 may include buttons, a sliding scale, a touch screen, membrane switches, or any other suitable selection mechanism. In certain embodiments, the controls 118 of the control base 106 may be flush with an external surface of the base 106. In certain embodiments, the control base 106 may include a display 200 that may show the set-point temperature, the actual temperature of its local environment, and the mode of the HVAC system 104. The display 200 may include a graphical user interface (GUI) and/or physical indicators disposed on a surface of the control base 106 such as decals or paint.

In some embodiments, the control base 106 may not include the controls 118 and/or the display 200. In such embodiments, the control base 106 may serve as a device on which the thermostat 102 mounts and charges, and through which the thermostat 102 and mobile device 144 communicate with the HVAC system 104. The control base 106 may still measure temperature and humidity levels of its local environment. However, the set-point temperature, mode of the HVAC system 104, and actual temperature may be displayed and/or configured from the mobile device 144 and/or the thermostat 102.

Figure 8:
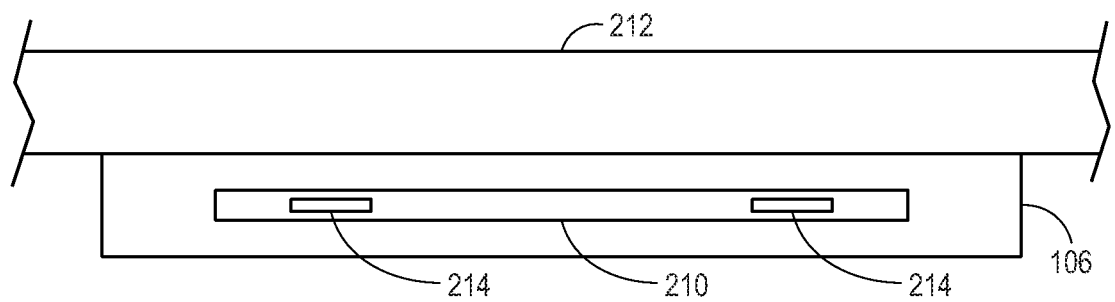
FIG. 8 is a perspective view of a base of the heating and cooling system of FIG. 5, in accordance with an embodiment of the present disclosure.

FIG. 8 is a top-perspective view of the control base 106. As shown, the control base 106 may include connector element 210, such as a ridge or slot which may interact with a corresponding slot or ridge, respectively, of the thermostat 102. In certain embodiments, the connector element 210 may include a clip, such as a spring clip. In certain embodiments, the control base 106 may be coupled to a wall 212, such as drywall, of the building. Further, the control base 106 may include magnets 214, which may couple to corresponding magnets on the thermostat. In other embodiments, the base 106 and/or the thermostat 102 may include other features to enable secure engagement between the control base 106 and the thermostat 102 when the thermostat 102 is mounted to the control base 106. For example, the control base 106 and/or the thermostat 102 may include snap-fitting features or interference fit features.

Figure 9:
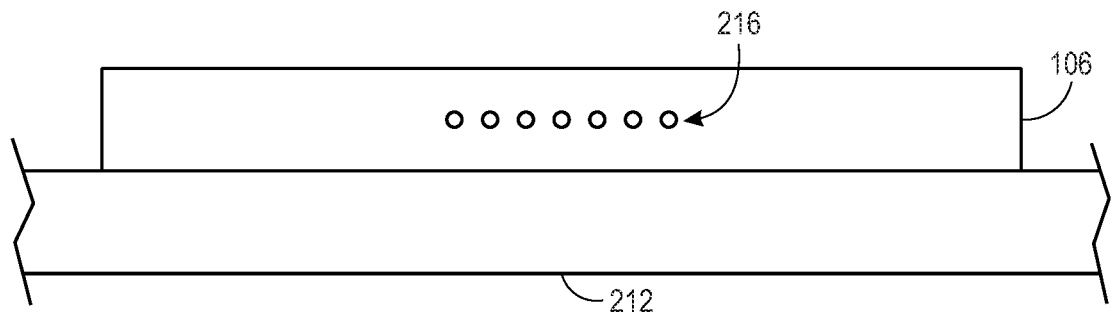
FIG. 9 is a perspective view of a base of the heating and cooling system of FIG. 5, in accordance with an embodiment of the present disclosure.

FIG. 9 is a bottom perspective view of the control base 106. As shown, the control base 106 may be coupled to the wall 212 of the building. The control base 106 may also include contact points 216 to charge the thermostat 102 when the thermostat 102 is mounted to the control base 106. Particularly, the battery 117 may be charged through the contact points 216 when the thermostat 102 is mounted to the control base 106.

Figure 10:
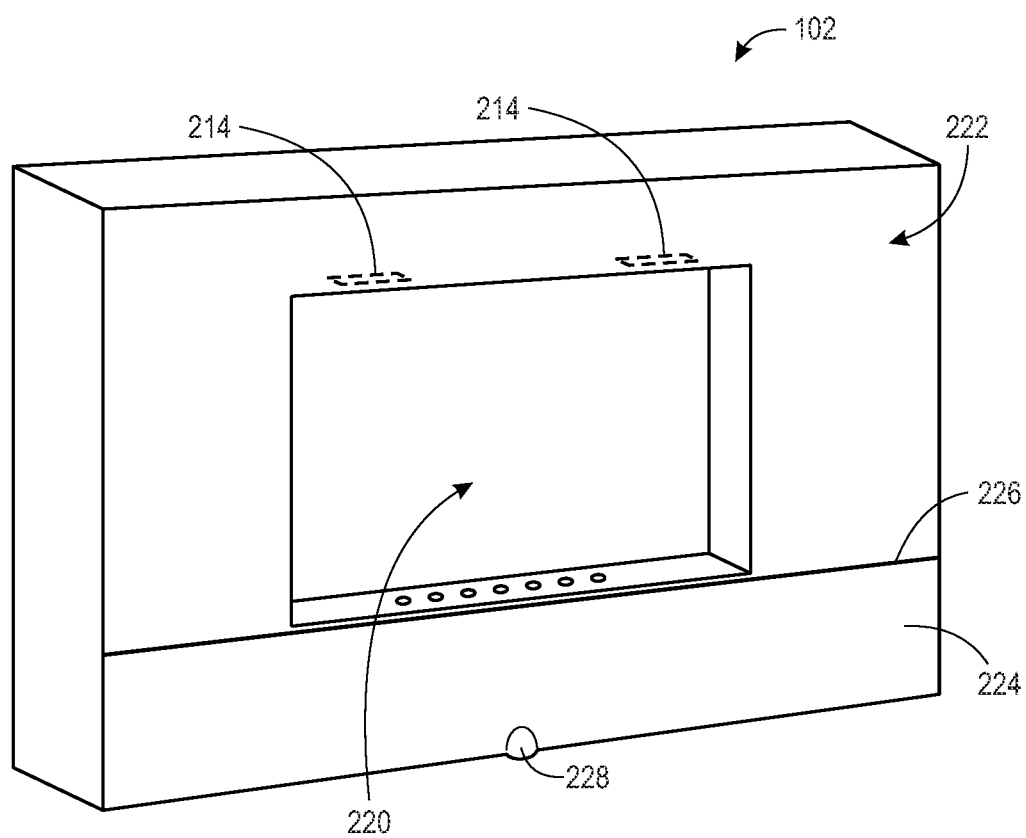
FIG. 10 is a perspective view of a thermostat of the heating and cooling system of FIG. 5, in accordance with an embodiment of the present disclosure.

FIG. 10 is a rear perspective view of the thermostat 102. The thermostat 102 may be mounted onto the control base 106 via a depression 220 disposed within a rear side 222 of the thermostat 102. Indeed, the shape of the control base 106 may substantially match the shape of the depression 220, such that the control base 106 is disposed within the depression 220 while the thermostat 102 is mounted to the control base 106. The magnets 214 disposed within the control base 106 may couple, via magnetic attraction, to the magnets 214 disposed within the thermostat 102 when the thermostat 102 is mounted to the control base 106. The thermostat 102 may further include a support device 224, such as a kickstand. The support device 224 may be flush with an external surface of the rear side 222 of the thermostat 102 while in a first position and may rotate outward about a hinge 226 to a second position. While the support device 224 is in the second position, the support device 224 may support the thermostat 102 in a substantially up-right position or a tilted position while the thermostat 102 is supported by a surface, such as a table. The support device 224 may also include a finger hold or recess 228, which may provide for a user too easily grip actuate the support device 224 between the first position and the leaned-back position.

Accordingly, the present disclosure is directed to providing systems and methods for a portable thermostat, which may be mounted to a base that is disposed on an interior wall of a building. Indeed, the thermostat may be equipped with sensors to measure a state, such as a temperature and a humidity level, of its local environment. In this manner, the thermostat may be moved between various areas, or rooms, of the building and communicate the state of an area of the various areas to a heating, ventilation, and air conditioning (HVAC) system so that the HVAC system may supply heated or cooled air to climatize the area according to a set-point temperature. Therefore, a user may carry the thermostat to whichever room of the building that the user wants to accurately match the set-point temperature. The base may also serve as a thermostat that senses a state of its local environment. That is, the base may communicate the state of its local environment to the HVAC system so that the HVAC system may supply heated or cooled air to climatize the local environment of the base according to the pre-set temperature.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
a portable thermostat configured to measure a first environmental condition of a first local environment of the portable thermostat within a building, wherein the portable thermostat comprises a user interface configured to receive, via selection of an indicator displayed on the user interface, an input designating the portable thermostat as a primary thermostat device of the system;
a control base configured to measure a second environmental condition of a second local environment of the control base within the building; and
communication circuitry configured to facilitate operation of a heating, ventilation, and/or air conditioning (HVAC) system configured to supply conditioned air to the building based on the first environmental condition of the first local environment or the second environmental condition of the second local environment, wherein the communication circuitry is configured to facilitate operation of the HVAC system to supply conditioned air to the building based on the first environmental condition of the first local environment in response to the user interface receiving the input designating the portable thermostat as the primary thermostat device.

2. The system of claim 1, wherein the control base is configured to control, via the communication circuitry, the operation of the HVAC system based on the second environmental condition while the portable thermostat is not designated as the primary thermostat device.

3. The system of claim 1, wherein the user interface is configured to receive an additional input designating a schedule of the HVAC system, wherein the schedule includes set-point values for the first environmental condition, the second environmental condition, or both, that are associated with designated time periods of a day.

4. The system of claim 3, wherein the schedule defines:
a first set-point value for the first environmental condition, the second environmental condition, or both, corresponding to a first time period of the day; and
a second set-point value for the first environmental condition, the second environmental condition, or both, corresponding to a second time period of the day.

5. The system of claim 4, wherein the control base is configured to control, via the communication circuitry, the operation of the HVAC system based on the first set-point value during the first time period of the day and to control the operation of the HVAC system based on the second set-point value during the second time period of the day.

6. The system of claim 1, wherein the control base comprises controls configured to receive an additional input from a user, wherein the control base is configured to adjust, based on the additional input, a set-point value for the second environmental condition, an operating mode of the HVAC system, or both.

7. The system of claim 1, wherein the user interface is configured to display a graphical user interface (GUI) comprising the indicator.

8. The system of claim 1, wherein the portable thermostat comprises a first sensor configured to detect the first environmental condition and the control base comprises a second sensor configured to detect the second environmental condition, wherein the first sensor, the second sensor, or both, comprises a temperature sensor, a humidity sensor, or both.

9. The system of claim 1, wherein the user interface is configured to receive an additional input correlating a plurality of set-point values for the first environmental condition with corresponding locations within the building.

10. The system of claim 9, wherein the control base is configured to control, via the communication circuitry, the operation of the HVAC system based on the first environmental condition and based on a set-point value of the plurality of set-point values corresponding to a current location of the portable thermostat within the building while the portable thermostat is designated as the primary thermostat device.

11. The system of claim 1, wherein the portable thermostat is configured to mount to the control base.

12. A system, comprising:
a portable thermostat comprising a first sensor configured to acquire feedback indicative of a first environmental condition of a first local environment of the portable thermostat, wherein the portable thermostat comprises a user interface configured to receive, via selection of an indicator displayed on the user interface, an input designating the portable thermostat as a primary thermostat device of the system, and the user interface is configured to display an indication that the portable thermostat is the primary thermostat device in response to receipt of the input designating the portable thermostat as the primary thermostat device; and
a control base comprising a second sensor configured to acquire additional feedback indicative of a second environmental condition of a second local environment of the control base, wherein the control base is configured to control a heating, ventilation, and/or air conditioning (HVAC) system based on the feedback or the additional feedback,
wherein the indicator is a user-selectable icon configured to display the indication that the portable thermostat is the primary thermostat device in response to receipt of the input designating the portable thermostat as the primary thermostat device.

13. The system of claim 12, wherein the control base is configured to control the HVAC system based on the feedback while the portable thermostat is designated as the primary thermostat device and to control the HVAC system based on the additional feedback while the portable thermostat is not designated as the primary thermostat device.

14. The system of claim 12, wherein the portable thermostat comprises a battery and a charging port configured to transmit electrical power from a power grid to the battery.

15. The system of claim 12, wherein the input is a first user input, the user interface is a first graphical user interface (GUI), and the control base comprises a second GUI, wherein the first GUI is configured to receive a second user input designating a first set-point value for the first environmental condition and the second GUI is configured to receive a third user input designating a second set-point value for the second environmental condition.

16. A system configured to control operation of a heating, ventilation, and/or air conditioning (HVAC) system, comprising:
a portable thermostat, comprising:
a first sensor configured to acquire feedback indicative of a first environmental condition of a first local environment of the portable thermostat; and
a user interface configured to display a graphical user interface (GUI) configured to receive a user input to:
cause an adjustment in operation of the HVAC system; and designate the portable thermostat as a primary thermostat device of the system; and a control base comprising a second sensor configured to acquire additional feedback indicative of a second environmental condition of a second local environment of the control base, wherein the control base is configured to control the HVAC system based on the feedback in response to the user interface receiving the user input designating the portable thermostat as the primary thermostat device, and wherein the GUI is configured to display an indication that the portable thermostat is the primary thermostat device in response to receipt of the user input designating the portable thermostat as the primary thermostat device.

17. The system of claim 16, wherein the GUI comprises a user-selectable indicator, the user input comprises selection of the user-selectable indicator, and the user-selectable indicator is configured to display the indication.

18. The system of claim 17, wherein the control base is configured to control the HVAC system based on the additional feedback while the portable thermostat is not designated as the primary thermostat device.

19. The system of claim 16, wherein the first sensor comprises a temperature sensor, a humidity sensor, or both.

20. The system of claim 1, wherein the portable thermostat is configured to mount to the control base.

* * * * *